K. W. BARTLETT.
LIQUID TREATING APPARATUS.
APPLICATION FILED SEPT. 23, 1907.
926,843.
Patented July 6, 1909.
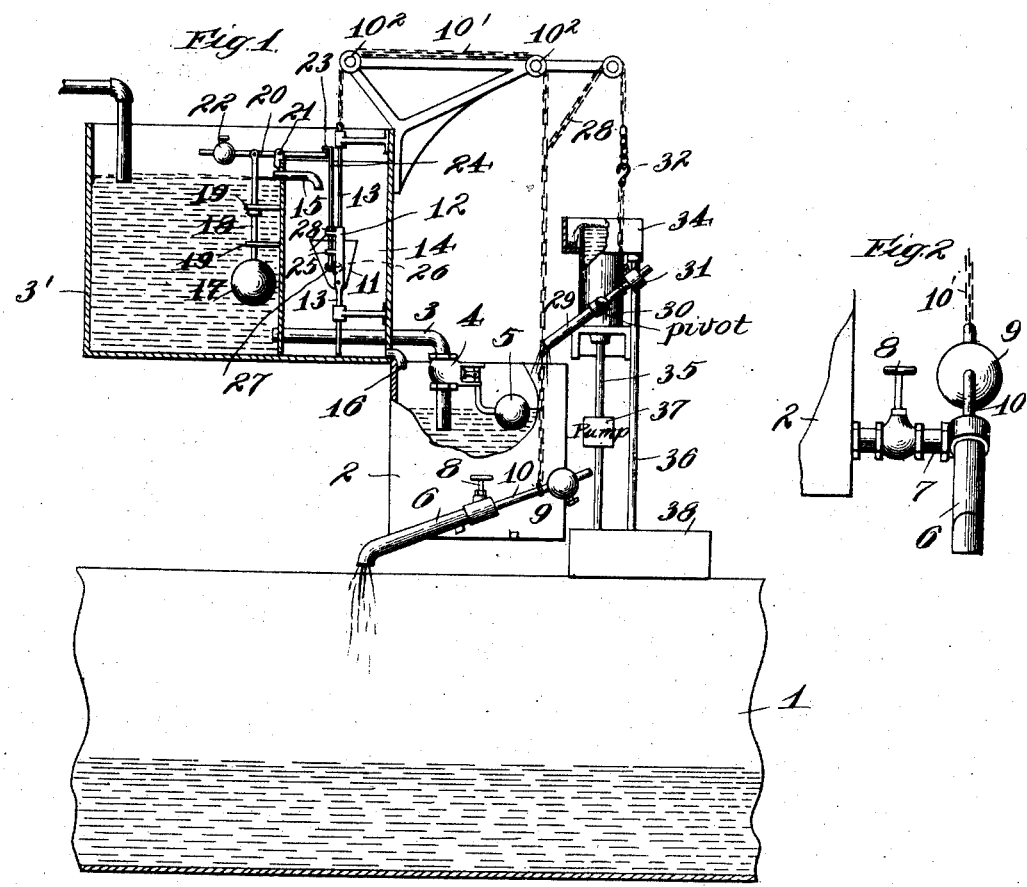
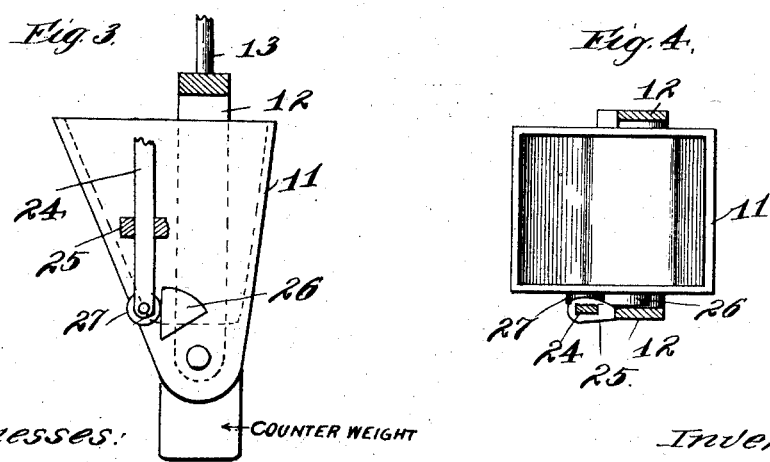
Witnesses:
Inventor:
Kent W. Bartlett,
By G. L. Cross
Atty

UNITED STATES PATENT OFFICE.

KENT W. BARTLETT, OF MADISON, WISCONSIN, ASSIGNOR TO NORTHERN WATER SOFTENER COMPANY, OF MADISON, WISCONSIN, A CORPORATION OF MAINE.

LIQUID-TREATING APPARATUS.

No. 926,843.  Specification of Letters Patent.  Patented July 6, 1909.

Application filed September 23, 1907. Serial No. 394,233.

*To all whom it may concern:*

Be it known that I, KENT W. BARTLETT, citizen of the United States, residing at Madison, in the county of Dane and State of Wisconsin, have invented a certain new and useful Improvement in Liquid-Treating Apparatus, of which the following is a full, clear, concise, and exact description, reference being had to the accompanying drawings, forming a part of this specification.

My invention relates to apparatus for governing the flow of material or liquid, and finds a very useful embodiment in water softening apparatus, and the invention will be specifically described as embodied in a water softening apparatus, though it is not to be limited thereto.

It is one object of my invention to govern the supply of chemical to the settling tank by the water before it is supplied to the settling tank, additional chemical being supplied to the tank when additional water is added to the tank. The same mechanism that controls the supply of chemical to said tank desirably also controls the supply of additional water to the tank. The said mechanism preferably intermittently effects communication between the settling tank and the fresh water supply and between the settling tank and the chemical supply, said mechanism operating when the water within a main supply tank has been drawn off to a predetermined extent for addition to the settling tank, the water, for purposes hereinafter to be expressed, after having been passed off from the main supply tank, preferably finding lodgment first in a constant level chamber, from which it is then supplied to the settling tank. There is desirably provided an adjusting means for governing the rate of flow either of the water flowing into the settling tank or of the chemical flowing into the settling tank, whereby the chemical and the water may be suitably proportioned in quantity, there being preferably two adjusting devices, one for the water and the other for the chemical, though I do not wish to be limited to the use of the two adjusting devices, as the proportions of chemical and water may be determined by the use of but one adjusting device.

I will explain my invention more fully by reference to the accompanying drawings, showing the preferred embodiment thereof, in which—

Figure 1 is a view somewhat diagrammatic but sufficiently comprehensive to show the general nature of the invention. Fig. 2 is a side elevation of a portion of the structure as it appears in Fig. 1. Fig. 3 is a side elevation of the bucket mechanism that preferably enters into my improved apparatus. Fig. 4 is a plan of the mechanism shown in Fig. 3.

Like parts are indicated by similar characters of reference throughout the different figures.

The settling tank, which is of well-known construction, is indicated at 1. Above it, there is illustrated a constant level chamber 2 that receives the water to be treated, and from which the water is discharged into the settling tank by the mechanism to be described. The constant level chamber receives water from the supply pipe 3 leading to a storage tank $3^1$, there being a valve 4 of well-known construction included within this pipe and governed in its action by a float 5 connected therewith, the float sinking whenever the level of the water in the chamber 2 recedes from its predetermined location to effect an operation of the valve 4 to permit the supply of enough water to the chamber 2 to restore the level.

An oscillating discharge pipe 6 has communication with the interior of the chamber 2, this pipe being mounted to oscillate upon a section of piping 7 extending toward the chamber 2 and including a valve 8, whereby the rate of flow through the pipe 6 may be regulated. An adjustable riding weight 9 is mounted upon an extension 10 secured to the piping 6, whereby said piping is nicely balanced. A bucket 11 is swung from a bail 12, which bail has a stem 13 that has connection with the extension 6 by a chain $10^1$ riding over pulleys $10^2$. The weight of this bucket 11 is such that when it is empty, the pipe 6 will be raised by the weight offered by extension 10 and the counterweight 9, but when this bucket is full of water, sufficient pull will be exerted upon the extension 10 to cause the pipe 6 to fall. The bucket 11 is filled when the water within the tank $3^1$ reaches or has about reached its upper limiting level, whereupon the pipe 6 falls to permit the flow of water from the chamber 2 to the settling tank. I provide restraining mechanism that prevents the bucket from tipping, due to the weight of the water therein, until the water in the tank $3^1$ has reached a predetermined lower level. When this lower level has been reached, the bucket automatically rotates upon its bail pivots, due to the weight of the water in the bucket, permitting the water to empty into the chamber 14 to lighten the pull upon the extension 10, whereupon the pipe 6 swings upwardly to cut off the flow of water from the chamber 2 to the settling tank 1. A pipe 15 permits the entry of water from the space about the chamber 14 (this chamber 14 being preferably within the tank $3^1$) to the bucket 11. Said bucket, after having received sufficient water from the pipe 15, causes the depression of the pipe 6, by reason of the water in the bucket 11, to permit the flow of fresh water from the chamber 2 to the settling tank. The chamber 14 is itself to be kept sufficiently clear of water at all times to permit the weight of the water in the bucket 11 to be effective in causing the pipe 6 to lower and to be effective to cause a tilt of the bucket when the restraining mechanism is relieved of influence upon the bucket when the water in the main supply tank $3^1$ has reached the neighborhood of the lower limiting level. For this purpose I desirably provide an eduction pipe 16 leading to any suitable place, as the tank 2. After the bucket 11 has been relieved of the influence of the restraining mechanism thereupon, the water in the bucket causes the bucket to tilt, so as to empty the bucket, as has hitherto been set forth, whereafter the bucket, by reason of the disposition of the metal composing the same, restores itself to its vertical position, in which position the restraining mechanism may resume its influence upon the bucket upon the rise of the water in the main supply tank $3^1$. I do not, however, wish to be limited to the form of restraining mechanism that enters into the control of the bucket, nor do I wish to be limited to the use of the bucket shown for accomplishing purposes herein set forth.

In the embodiment of the invention herein shown, the restraining mechanism includes a float 17 of comparatively large size, provided with a vertically moving stem 18 suitably directed in its travel by guides 19, a lever 20 pivoted between its ends at 21 and having an adjustable counterweight 22 upon one end and adapted for engagement with the nose 23 provided upon the upper end of a vertically traveling rod 24 which is directed in its travel by means of guides 25 projecting from the bail 12 of the bucket. The body of the bucket carries a cam lug 26 adapted for engagement with a roller 27 provided upon the lower end of the rod 24, the vertical face of the lug 26 normally engaging the said roller to hold said bucket in vertical place. The rod 24 works downwardly by the force of gravity, said rod being limited in its downward travel by the lug 28 adapted for engagement with the upper one of the guides 25, whereby the roller 27 is insured engagement with the vertical face of the lug 26. The roller 27, when thus in engagement with the lug 26, holds the bucket 11 in its vertical place, so that said bucket may become filled to an extent that will force the depression of the pipe 6. The bucket is maintained in vertical position until the float 17 has been permitted to descend a sufficient distance, consequent upon the removal of sufficient water from the main supply tank $3^1$, the stem 18 then drawing the lever 20 downwardly and forcing engagement between the nose 23 and said lever 20, thereby effecting the elevation of the rod 24 and the disengagement of the roller 27 from the cam 26, the water in the bucket 11 thereupon effecting the rotation of said bucket to permit the water to be emptied therefrom, whereupon the weight furnished by the water in the bucket to force a depression of the pipe 6 is removed, permitting said pipe to rise to cut off the flow of fresh water from the chamber 2 to the settling tank.

When the water has been emptied from the bucket 11, said bucket is immediately restored to a vertical position and is bodily elevated by the preponderating extension 10. The same mechanism that effects the admission of fresh water to the settling tank desirably also controls the admission of chemical to the settling tank, to which end I provide a chain connection 28 between the bucket mechanism and the chemical discharge spout 29 which is desirably swingingly mounted or rotatively mounted as is the water discharge pipe 6, this chemical discharge pipe having communication with a chemical reservoir 30.

The discharge spouts 6 and 29 are, by the apparatus illustrated, permitted to be elevated at the same time and to be lowered at the same time, so that the flow of fresh water and fresh chemical to the settling tank begins and ends substantially simultaneously. I do not wish to be limited to the use of swinging spouts for controlling the admission of chemical and water to the settling tank. The spout 29 is desirably provided with an adjustable weight 31 to adjust the force with which said spout may fall, while the extent to which said spout 29 may fall may be regulated by an adjustable hook and chain connection 32.

The source of immediate supply of chemical to the discharge spout 29, is of novel construction, and forms the subject-matter of my co-pending application Serial No. 394,232, filed September 23, 1907, which co-pending application relates broadly to other features herein disclosed and forming the subject-matter of the claims herein.

As indicated in Fig. 1, there is illustrated a jacket 34 about the upper end of the chamber 30, a supply pipe 35 leading to the chamber 30 while an eduction pipe 36 leads from the jacket chamber 34, which latter pipe removes the chemical which overflows from the chamber 30 into the surrounding chamber 34. A pump 37 forces the chemical from a suitable chemical reservoir 38 through the pipe 35 to the chamber 30, from which chamber the chemical is either totally discharged through the chamber 34 and the pipe 36 or is but partially discharged through said latter chamber and pipe when the chemical is being discharged through the spout 29. By this arrangement a uniform quantity of liquid chemical is always present to insure a uniform flow of the chemical through the spout 29.

By reason of the constant level chamber 2 and the chemical supply chamber 30, the water and liquid chemical are supplied to the settling chamber at uniform pressures, insuring the supply to the tank of correct proportions of water and chemical. The water either flows at a fixed pressure and volume or not at all and the chemical is either flowing at a fixed pressure and volume or not at all.

I prefer the chemical in liquid form for supply to the settling tank. By liquid chemical I do not necessarily mean a solution, as the chemical may be held in suspension within the water, the water with the suspended chemical constituting a liquid chemical as I use the expression.

I have herein shown my invention as embodied in water softening apparatus, but I do not wish to be limited to this application of the invention, as I desire to have the invention protected irrespective of the use to which it is put.

Having thus described my invention, I claim as new and desire to secure by Letters-Patent the following:—

1. Apparatus of the class described including a main supply tank, a constant level chamber for receiving liquid therefrom, a receiving tank for receiving liquid from the constant level chamber, and mechanism for governing the admission of liquid to the receiving tank and operated by the liquid within the main supply tank when the liquid within the main supply tank has reached a predetermined upper level to permit the flow of liquid from the constant level chamber to the receiving tank, and operable when the liquid in the main supply tank has reached a predetermined lower level to cut off the supply of liquid from the constant level chamber to the receiving tank.

2. Apparatus of the class described including a main supply tank, a constant level chamber for receiving liquid therefrom, a receiving tank for receiving liquid from the constant level chamber, mechanism for governing the admission of liquid to the receiving tank and operated by the liquid within the main supply tank when the liquid within the main supply tank has reached a predetermined upper level to permit the flow of liquid from the constant level chamber to the receiving tank, and operable when the liquid in the main supply tank has reached a predetermined lower level to cut off the supply of liquid from the constant level chamber to the receiving tank, and restraining mechanism governed by the liquid in the main supply tank for preventing the aforesaid mechanism from operating during the time the liquid in the tank is descending from one level to the other.

3. Apparatus of the class described including a main supply tank, a constant level chamber for receiving liquid therefrom, a receiving tank for receiving liquid from the constant level chamber, mechanism for governing the admission of liquid to the receiving tank and operated by the liquid within the main supply tank when the liquid within the main supply tank has reached a predetermined upper level to permit the flow of liquid from the constant level chamber to the receiving tank, and operable when the liquid in the main supply tank has reached a predetermined lower level to cut off the supply of liquid from the constant level chamber to the receiving tank, and means for effecting the supply of chemical to the settling tank, governed by the mechanism which is controlled by the liquid in the main supply tank.

4. Apparatus of the class described including a main supply tank, a constant level chamber for receiving liquid therefrom, a receiving tank for receiving liquid from the constant level chamber, mechanism for governing the admission of liquid to the receiving tank and operated by the liquid within the main supply tank when the liquid within the main supply tank has reached a predetermined upper level to permit the flow of liquid from the constant level chamber to the receiving tank, and operable when the liquid in the main supply tank has reached a predetermined lower level to cut off the supply of liquid from the constant level chamber to the receiving tank, restraining mechanism governed by the liquid in the main supply tank for preventing the aforesaid mechanism from operating during the time the liquid in the tank is descending from one level to the other, and means for effecting the supply of chemical to the receiving tank, governed by the mechanism which is controlled by the liquid in the main supply tank.

5. Apparatus of the class described including a supply tank, a receiving tank for receiving the liquid from the supply tank, and mechanism for governing the admission of said liquid to the receiving tank and operated by the liquid within the supply tank when the liquid within the supply tank has reached a predetermined upper level to permit the flow of said liquid to the receiving tank, and operable when the liquid in the supply tank has reached a predetermined lower level to cut off the supply of said liquid to the receiving tank.

6. Apparatus of the class described including a supply tank, a receiving tank for receiving the liquid from the supply tank, mechanism for governing the admission of said liquid to the receiving tank and operated by the liquid within the supply tank when the liquid within the supply tank has reached a predetermined upper level to permit the flow of said liquid to the receiving tank, and operable when the liquid in the supply tank has reached a predetermined lower level to cut off the supply of said liquid to the receiving tank, and restraining mechanism governed by the liquid in the supply tank for preventing the aforesaid mechanism from operating during the time the said liquid in the tank is descending from one level to the other.

7. Apparatus of the class described including a supply tank, a receiving tank for receiving the liquid from the supply tank, mechanism for governing the admission of said liquid to the receiving tank and operated by the liquid within the supply tank when the liquid within the supply tank has reached a predetermined upper level to permit the flow of said liquid to the receiving tank, and operable when the liquid in the supply tank has reached a predetermined lower level to cut off the supply of said liquid to the receiving tank, and means for effecting the supply of chemical to the receiving tank, governed by the mechanism which is controlled by the liquid in the supply tank.

8. Apparatus of the class described including a supply tank, a receiving tank for receiving the liquid from the supply tank, mechanism for governing the admission of said liquid to the receiving tank and operated by the liquid within the supply tank when the liquid within the supply tank has reached a predetermined upper level to permit the flow of said liquid to the receiving tank, and operable when the liquid in the supply tank has reached a predetermined lower level to cut off the supply of said liquid to the receiving tank, restraining mechanism governed by the liquid in the supply tank for preventing the aforesaid mechanism from operating during the time the said liquid in the tank is descending from one level to the other, and means for effecting the supply of chemical to the receiving tank, governed by the mechanism which is controlled by the liquid in the supply tank.

9. Apparatus of the class described including a supply tank, a receiving tank for receiving liquid from the supply tank, a source of chemical supply, and mechanism for governing the admission of chemical to the receiving tank operated by the liquid within the supply tank when the liquid within the supply tank has reached a predetermined upper level to permit the flow of chemical to the receiving tank, and operable when the liquid in the supply tank has reached a predetermined lower level to cut off the supply of chemical to the receiving tank.

10. Apparatus of the class described including a supply tank, a receiving tank for receiving liquid from the supply tank, a source of chemical supply, mechanism for governing the admission of chemical to the receiving tank operated by the liquid within the supply tank when the liquid within the supply tank has reached a predetermined upper level to permit the flow of chemical to the receiving tank, and operable when the liquid in the supply tank has reached a predetermined lower level to cut off the supply of chemical to the receiving tank, and restraining mechanism governed by the liquid in the supply tank for preventing the aforesaid mechanism from operating during the time the said liquid in the tank is descending from one level to the other.

11. Apparatus of the class described including a supply tank, a receiving tank for receiving liquid from the supply tank, a source of chemical supply, mechanism for governing the admission of chemical to the receiving tank operated by the liquid within the supply tank when the liquid within the supply tank has reached a predetermined upper level to permit the flow of chemical to the receiving tank, and operable when the liquid in the supply tank has reached a predetermined lower level to cut off the supply of chemical to the receiving tank, and means for effecting the supply of chemical to the receiving tank, governed by the mechanism which is controlled by the liquid in the supply tank.

12. Apparatus of the class described including a supply tank, a receiving tank for receiving liquid from the supply tank, a source of chemical supply, mechanism for governing the admission of chemical to the receiving tank operated by the liquid within the supply tank when the liquid within the supply tank has reached a predetermined upper level to permit the flow of chemical to the receiving tank, and operable when the liquid in the supply tank has reached a predetermined lower level to cut off the supply of chemical to the receiving tank, restraining mechanism governed by the liquid in the supply tank for preventing the aforesaid mechanism from operating during the time the said liquid in the tank is descending from one level to the other, and means for effecting the supply of chemical to the receiving tank, governed by the mechanism which is controlled by the liquid in the supply tank.

13. Apparatus of the class described including a main supply tank, a constant level chamber for receiving liquid therefrom, a receiving tank for receiving liquid from the constant level chamber, and mechanism for governing the admission of liquid to the receiving tank and operated by the liquid within the main supply tank when the liquid within the main supply tank has reached a predetermined upper level to permit the flow of liquid from the constant level chamber to the receiving tank, and operable when the liquid in the main supply tank has reached a predetermined lower level to cut off the supply of liquid from the constant level chamber to the receiving tank, the mechanism governed by the liquid in the supply tank including a bucket, which, when sufficiently empty of liquid, will be ineffective, but which, when sufficiently full of liquid, will be effective.

14. Apparatus of the class described including a main supply tank, a constant level chamber for receiving liquid therefrom, a receiving tank for receiving liquid from the constant level chamber, mechanism for governing the admission of liquid to the receiving tank and operated by the liquid within the main supply tank when the liquid within the main supply tank has reached a predetermined upper level to permit the flow of liquid from the constant level chamber to the receiving tank, and operable when the liquid in the main supply tank has reached a predetermined lower level to cut off the supply of liquid from the constant level chamber to the receiving tank, and restraining mechanism governed by the liquid in the main supply tank for preventing the aforesaid mechanism from operating during the time the liquid in the tank is descending from one level to the other, the mechanism governed by the liquid in the supply tank including a bucket, which, when sufficiently empty of liquid, will be ineffective, but which, when sufficiently full of liquid, will be effective, the restraining mechanism including a float and mechanism operated thereby for preventing the discharge of liquid from the bucket while the liquid is descending from one level to another, said float mechanism operating when the liquid in the supply tank rises to permit the liquid to empty from the bucket.

15. Apparatus of the class described including a main supply tank, a constant level chamber for receiving liquid therefrom, a receiving tank for receiving liquid from the constant level chamber, mechanism for governing the admission of liquid to the receiving tank and operated by the liquid within the main supply tank when the liquid within the main supply tank has reached a predetermined upper level to permit the flow of liquid from the constant level chamber to the receiving tank, and operable when the liquid in the main supply tank has reached a predetermined lower level to cut off the supply of liquid from the constant level chamber to the receiving tank, and means for effecting the supply of chemical to the receiving tank, governed by the mechanism which is controlled by the liquid in the main supply tank, the mechanism governed by the liquid in the supply tank including a bucket, which, when sufficiently empty of liquid, will be ineffective, but which, when sufficiently full of liquid, will be effective.

16. Apparatus of the class described including a main supply tank, a constant level chamber for receiving liquid therefrom, a receiving tank for receiving liquid from the constant level chamber, mechanism for governing the admission of liquid to the receiving tank and operated by the liquid within the main supply tank when the liquid within the main supply tank has reached a predetermined upper level to permit the flow of liquid from the constant level chamber to the receiving tank, and operable when the liquid in the main supply tank has reached a predetermined lower level to cut off the supply of liquid from the constant level chamber to the receiving tank, restraining mechanism governed by the liquid in the main supply tank for preventing the aforesaid mechanism from operating during the time the liquid in the tank is descending from one level to the other, and means for effecting the supply of chemical to the receiving tank, governed by the mechanism which is controlled by the liquid in the main supply tank, the mechanism governed by the liquid in the supply tank including a bucket, which, when sufficiently empty of liquid, will be ineffective, but which, when sufficiently full of liquid, will be effective, the restraining mechanism including a float and mechanism operated thereby for preventing the discharge of liquid from the bucket while the liquid is descending from one level to another, said float mechanism operating when the liquid in the supply tank falls to permit the liquid to empty from the bucket.

17. Apparatus of the class described including a supply tank, a receiving tank for receiving the liquid from the supply tank, and mechanism for governing the admission of said liquid to the receiving tank and operated by the liquid within the supply tank when the liquid within the supply tank has reached a predetermined upper level to permit the flow of said liquid to the receiving tank, and operable when the liquid in the supply tank has reached a predetermined lower level to cut off the supply of said liquid to the receiving tank, the mechanism governed by the liquid in the supply tank including a bucket, which, when sufficiently empty of liquid, will be ineffective, but which, when sufficiently full of liquid, will be effective.

18. Apparatus of the class described including a supply tank, a receiving tank for receiving the liquid from the supply tank, mechanism for governing the admission of said liquid to the receiving tank and operated by the liquid within the supply tank when the liquid within the supply tank has reached a predetermined upper level to permit the flow of said liquid to the receiving tank, and operable when the liquid in the supply tank has reached a predetermined lower level to cut off the supply of said liquid to the receiving tank, and restraining mechanism governed by the liquid in the supply tank for preventing the aforesaid mechanism from operating during the time the said liquid in the tank is descending from one level to the other, the mechanism governed by the liquid in the supply tank including a bucket, which, when sufficiently empty of liquid, will be ineffective, but which, when sufficiently full of liquid, will be effective, the restraining mechanism including a float and mechanism operated thereby for preventing the discharge of liquid from the bucket while the liquid is descending from one level to another, said float mechanism operating when the liquid in the supply tank falls to permit the liquid to empty from the bucket.

19. Apparatus of the class described including a supply tank, a receiving tank for receiving the liquid from the supply tank, mechanism for governing the admission of said liquid to the receiving tank and operated by the liquid within the supply tank when the liquid within the supply tank has reached a predetermined upper level to permit the flow of said liquid to the receiving tank, and operable when the liquid in the supply tank has reached a predetermined lower level to cut off the supply of said liquid to the receiving tank, and means for effecting the supply of chemical to the receiving tank, governed by the mechanism which is controlled by the liquid in the supply tank, the mechanism governed by the liquid in the supply tank including a bucket, which, when sufficiently empty of liquid, will be ineffective, but which, when sufficiently full of liquid, will be effective.

20. Apparatus of the class described including a supply tank, a receiving tank for receiving the liquid from the supply tank, mechanism for governing the admission of said liquid to the receiving tank and operated by the liquid within the supply tank when the liquid within the supply tank has reached a predetermined upper level to permit the flow of said liquid to the receiving tank, and operable when the liquid in the supply tank has reached a predetermined lower level to cut off the supply of said liquid to the receiving tank, restraining mechanism governed by the liquid in the supply tank for preventing the aforesaid mechanism from operating during the time the said liquid in the tank is descending from one level to the other, and means for effecting the supply of chemical to the receiving tank, governed by the mechanism which is controlled by the liquid in the supply tank, the mechanism governed by the liquid in the supply tank including a bucket, which, when sufficiently empty of liquid, will be ineffective, but which, when sufficiently full of liquid, will be effective, the restraining mechanism including a float and mechanism operated thereby for preventing the discharge of liquid from the bucket while the liquid is descending from one level to another, said float mechanism operating when the liquid in the supply tank falls to permit the liquid to empty from the bucket.

21. Apparatus of the class described including a supply tank, a receiving tank for receiving liquid from the supply tank, a source of chemical supply, and mechanism for governing the admission of chemical to the receiving tank operated by the liquid within the supply tank when the liquid within the supply tank has reached a predetermined upper level to permit the flow of chemical to the receiving tank, and operable when the liquid in the supply tank has reached a predetermined lower level to cut off the supply of chemical to the receiving tank, the mechanism governed by the liquid in the supply tank including a bucket, which, when sufficiently empty of liquid, will be ineffective, but which, when sufficiently full of liquid, will be effective 22. Apparatus of the class described including a supply tank, a receiving tank for receiving liquid from the supply tank, a source of chemical supply, mechanism for governing the admission of chemical to the receiving tank operated by the liquid within the supply tank when the liquid within the supply tank has reached a predetermined upper level to permit the flow of chemical to the receiving tank, and operable when the liquid in the supply tank has reached a predetermined lower level to cut off the supply of chemical to the receiving tank, and restraining mechanism governed by the liquid in the supply tank for preventing the aforesaid mechanism from operating during the time the said liquid in the tank is descending from one level to the other, the mechanism governed by the liquid in the supply tank including a bucket, which, when sufficiently empty of liquid, will be ineffective, but which, when sufficiently full of liquid, will be effective, the restraining mechanism including a float and mechanism operated thereby for preventing the discharge of liquid from the bucket while the liquid is descending from one level to another, said float mechanism operating when the liquid in the supply tank falls to permit the liquid to empty from the bucket.

23. Apparatus of the class described including a supply tank, a receiving tank for receiving liquid from the supply tank, a source of chemical supply, mechanism for governing the admission of chemical to the receiving tank operated by the liquid within the supply tank when the liquid within the supply tank has reached a predetermined upper level to permit the flow of chemical to the receiving tank, and operable when the liquid in the supply tank has reached a predetermined lower level to cut off the supply of chemical to the receiving tank, and means for effecting the supply of chemical to the receiving tank, governed by the mechanism which is controlled by the liquid in the supply tank, the mechanism governed by the liquid in the supply tank including a bucket, which, when sufficiently empty of liquid, will be ineffective, but which, when sufficiently full of liquid, will be effective.

24. Apparatus of the class described including a supply tank, a receiving tank for receiving liquid from the supply tank, a source of chemical supply, mechanism for governing the admission of chemical to the receiving tank operated by the liquid within the supply tank when the liquid within the supply tank has reached a predetermined upper level to permit the flow of chemical to the receiving tank, and operable when the liquid in the supply tank has reached a predetermined lower level to cut off the supply of chemical to the receiving tank, restraining mechanism governed by the liquid in the supply tank for preventing the aforesaid mechanism from operating during the time the said liquid in the tank is descending from one level to the other, and means for effecting the supply of chemical to the receiving tank, governed by the mechanism which is controlled by the liquid in the supply tank, the mechanism governed by the liquid in the supply tank including a bucket, which, when sufficiently empty of liquid, will be ineffective, but which, when sufficiently full of liquid, will be effective, the restraining mechanism including a float and mechanism operated thereby for preventing the discharge of liquid from the bucket while the liquid is descending from one level to another, said float mechanism operating when the liquid in the supply tank falls to permit the liquid to empty from the bucket.

25. An apparatus of the class described including a receiving tank, a source of liquid supply therefor, an oscillating spout having communication at one end with the source of liquid supply and adapted at its other end to discharge liquid flowing from said supply, and mechanism for controlling the oscillation of the spout to prevent or permit the flow of liquid therethrough from said source of supply and, in turn, governed by the liquid in the source of liquid supply.

26. An apparatus of the class described including a receiving tank, a source of liquid supply therefor, a source of material supply, an oscillating spout having communication at one end with the source of material supply and adapted at its other end to discharge said material flowing from said material supply, and mechanism for controlling the oscillation of the spout to prevent or permit the flow of material therethrough from said source of material supply and, in turn, governed by the liquid in the source of liquid supply.

27. An apparatus of the class described including a receiving tank, a source of liquid supply therefor, an oscillating spout having communication at one end with the source of liquid supply and adapted at its other end to discharge liquid flowing from said supply, and mechanism for controlling the oscillation of the spout to prevent or permit the flow of liquid therethrough from said source of supply and, in turn, governed by the liquid without it being passed to the tank.

28. An apparatus of the class described including a receiving tank, a source of liquid supply therefor, a source of material supply, an oscillating spout having communication at one end with the source of material supply and adapted at its other end to discharge said material flowing from said material supply, and mechanism for controlling the oscillation of the spout to prevent or permit the flow of material therethrough from said source of material supply and, in turn, governed by the liquid without it being passed to the tank.

29. An apparatus of the class described including a tank, a source of liquid supply therefor, a bucket adapted to receive and be operated by liquid from the liquid source without the liquid being first discharged into the tank, a source of material supply, and mechanism governed by said bucket for controlling the flow of liquid from said source of liquid supply to said tank and for controlling the flow of material from said source of material supply to the tank.

30. Apparatus for chemically treating liquids including a tank, a source of liquid supply, a source of chemical supply, and mechanism governed by the liquid in the source of liquid supply, and serving when the liquid in the liquid supply reaches one level, to establish the flow of chemical from said source of chemical supply to the tank, and when the liquid in the source of liquid supply reaches an alternative level, to cut off the flow of chemical to the tank.

In witness whereof, I hereunto subscribe my name this 12th day of September A. D., 1907.

KENT W. BARTLETT.

Witnesses:
   G. L. CRAGG,
   L. G. STROH.